United States Patent [19]
Chen

[11] Patent Number: 5,955,940
[45] Date of Patent: Sep. 21, 1999

[54] INTEGRATED SECURITY DOOR LOCK SYSTEM

[75] Inventor: Michael Chen, Taipei Hsien, Taiwan

[73] Assignee: Advance Security Inc., Taipei Hsien, Taiwan

[21] Appl. No.: 08/877,025

[22] Filed: Jun. 17, 1997

[51] Int. Cl.⁶ .................................................. B60R 25/10
[52] U.S. Cl. .................... 340/426; 340/428; 340/429; 340/430; 307/10.2; 180/287; 180/167; 123/179.4; 123/179.2; 290/38 C
[58] Field of Search ...................... 340/426, 428, 340/429, 430; 307/10.2, 10.3, 10.4, 10.5, 10.6; 180/287, 167; 123/179.4, 179.2, 179.3; 290/38 C, 38 D

[56] References Cited

U.S. PATENT DOCUMENTS

| | | |
|---|---|---|
| 4,227,588 | 10/1980 | Biancardi ................................. 180/167 |
| 4,236,594 | 12/1980 | Ramsperger ............................ 180/167 |
| 4,345,554 | 8/1982 | Hildreth et al. ...................... 123/179.2 |
| 4,486,806 | 12/1984 | Mochida et al. ....................... 307/10.2 |
| 4,598,209 | 7/1986 | Garlinghouse ........................ 123/179.4 |
| 4,674,454 | 6/1987 | Phairr .................................... 123/179.2 |
| 4,733,638 | 3/1988 | Anderson ................................ 180/287 |
| 4,893,240 | 1/1990 | Karkouti ............................... 123/179.4 |
| 4,928,778 | 5/1990 | Tin ......................................... 180/167 |
| 5,072,703 | 12/1991 | Sutton ................................... 123/179.4 |
| 5,184,584 | 2/1993 | Cantrell ................................ 123/179.2 |
| 5,248,898 | 9/1993 | Periou ..................................... 307/10.2 |
| 5,349,931 | 9/1994 | Gottlieb et al. ....................... 123/179.2 |
| 5,387,897 | 2/1995 | Bechtle et al. ........................... 340/426 |
| 5,638,044 | 6/1997 | Chua ........................................ 340/426 |
| 5,673,017 | 9/1997 | Dery et al. .............................. 340/426 |

*Primary Examiner*—Nina Tong
*Attorney, Agent, or Firm*—Browdy and Neimark

[57] ABSTRACT

An integrated security door lock system which combines a vehicle security system with a remote controlled engine starting system so as to start a vehicle's engine, air conditioning; and to start an engine at a preset time or temperature and the alarm system of a vehicle by way of a remote control transmitter.

6 Claims, 5 Drawing Sheets

INTEGRATED SECURITY DOOR LOCK SYSTEM

BACKGROUND OF THE INVENTION

The present invention relates to an integrated security door lock system which combines a vehicle security system with a remotely controlled engine starting system so as to start a vehicle'a engine, air conditioning; and to start an engine at a preset time or temperature and a security system of a vehicle by way of a remote control transmitter.

Most vehicles in big cities, especially expensive ones, are equipped with security or alarm systems to protect the vehicles from sabotage or stealing by burglars. The current security systems adopted by most vehicles are provided with functions of remote engine starting, engine starting at a preset time or temperature and burglar alarm. Such security system is equipped with two wires to connect to a remote engine starting device and an alarm device respectively, as shown in FIG. 1. A user makes use of a preset third channel to transmit an engine starting signal; after the engine starting signal is received, a response signal is issued accordingly to instruct the security system to switch off the burglar alarm system. It means that if a vehicle's engine is started by remote control or started at a preset time or temperature, the user does not get on the vehicle to drive, then part of the detecting functions will become invalidated; unless the user gets on the vehicle to start the vehicle by a key or reopen the security system to resume its detecting mode. Under such a condition, the security system can perform all its function again. This makes the security system useless at then.

However, there is another security door lock device combined with a current security system wherein when an engine is in an "ON" state, the doors will be locked automatically; and will be unlocked when the engine is in an "OFF" state so as to protect a vehicle from being robbed. There are a number of problems when such a security system is combined with a remotely-controlled engine starting device:

1. the security system is in an "OFF" state, the doors are in an unlocked state, when the engine is remotely started, and the security door lock system detects the engine is in an "ON" state, the doors will be locked automatically; the user must open the doors with a key to get on a vehicle, causing inconvenience.
2. when the security system is in an "ON" state, the doors are in a locked state; if the engine is started at a preset time or temperature then, the engine will resume an "OFF" state after 10 minutes, the doors will be unlocked automatically, this will make the security system useless at all.
3. when the security system is in an "ON" state, the doors are in a locked state; if the engine is remotely started and then is set in a "ON" state, the doors are still locked. If a driver wants to enter a vehicle, the engine must be turned off first and then switch off the security system in order to get on the vehicle. If the driver first switches off the security system, the doors will be freed from a locking state in theory, but when the security system detects the engine is "ON", the doors will be locked again, the driver must use a key to enter the vehicle. If the driver wants to open the door first with a key directly, the security system will be actuated and must be turned off to stop the alarm, then making the function of remote engine start useless.

SUMMARY OF THE INVENTION

Therefore, the primary object of the present invention is to provide an integrated security door lock system which can be used to start an engine by remote control and remain the necessary alarm functions.

Another object of the present invention is to provide an integrated security system which can be mounted and used with less cost and time.

The features of the present invention lies in that:

1. The security system uses only one output wire to connect to the remote engine starting system.
2. The security system is set off only during the remote engine starting operation, and is set on all the rest of the time.
3. The security door lock system will not release a door locking state of the doors as a result of the stop of an engine.

DETAILED DESCRIPTION OF THE PREFERRED EMBODIMENT

Figure 1:
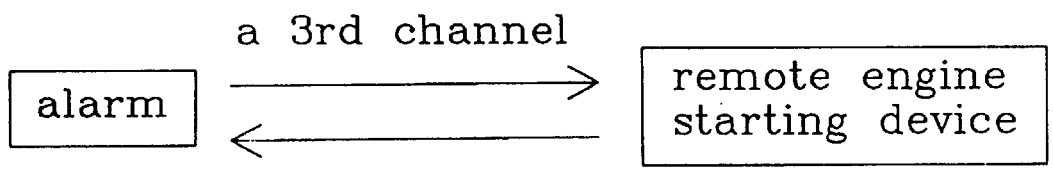
FIG. 1 is a diagram showing a prior art.
Figure 2:
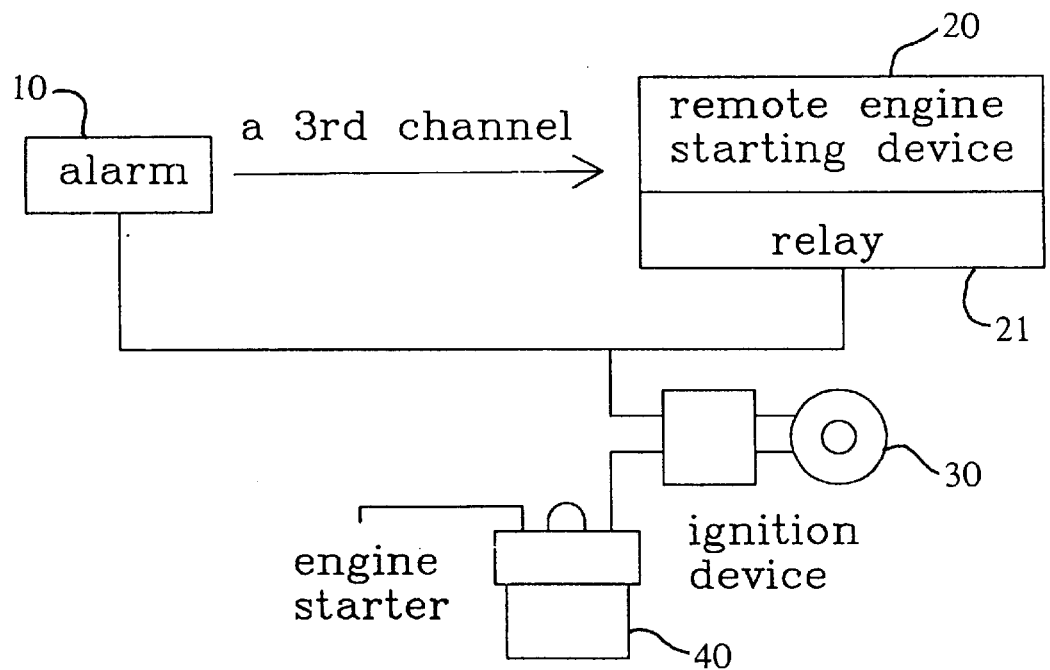
FIG. 2 is a diagram showing the structure of the present invention.

Referring to FIG. 2, an integrated security lock system of the present invention is comprised of an alarm unit 10, a remote controlled engine ignition unit 20, a relay 21, an ignition device 30 and an engine starter 40.

The remote controlled engine ignition unit 20 operated by a CPU software is equipped with a relay 21 for effecting relay function. When the system is not set in an ON/OFF mode of an ignition detecting device, the relay 21 is not in a working state; reversely, the relay 21 is put in a working state. The alarm unit 10 is coupled to the remote controlled engine ignition unit 20 by way of a single output wire. The engine ignition unit 20 and the alarm unit 10 are coupled to the ignition device 30 which is connected to an engine starter 40 at the output terminal thereof.

Figure 3:
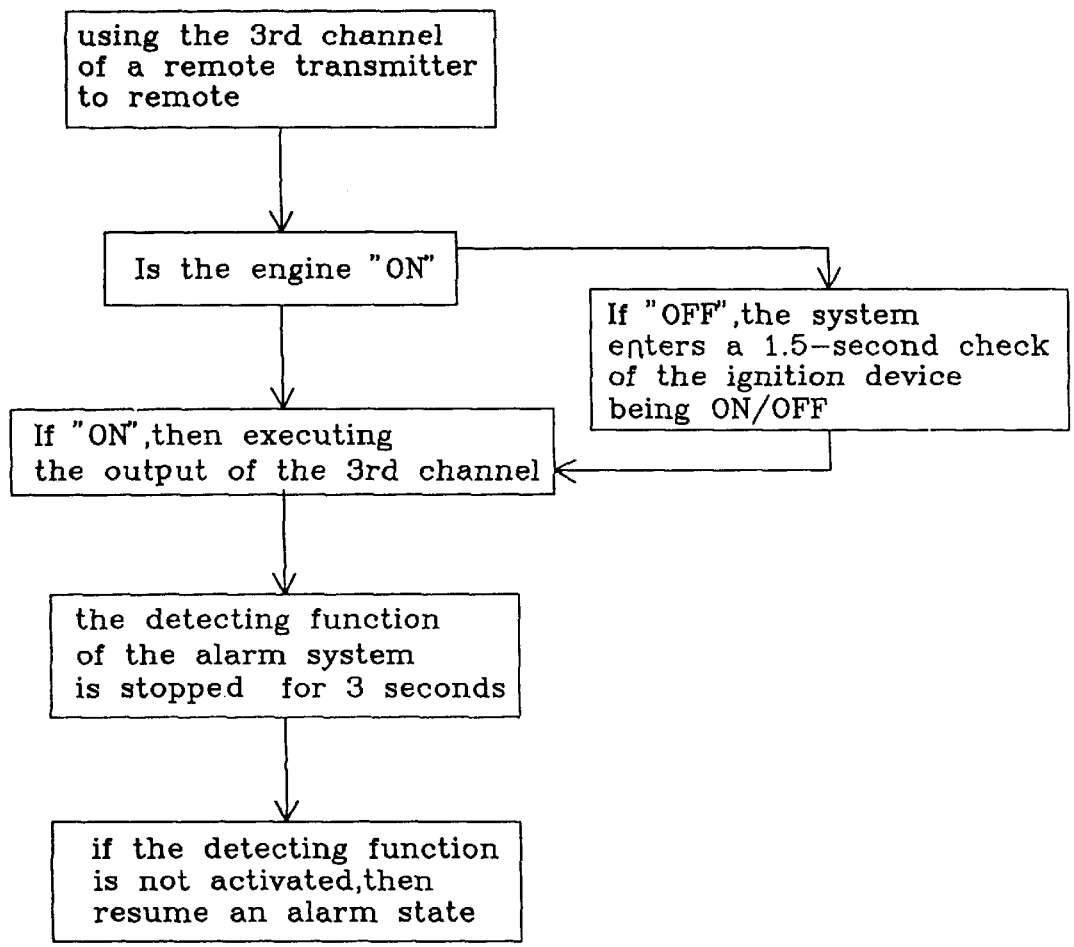
FIG. 3 is a flow chart 1 of the present invention.
Figure 4:
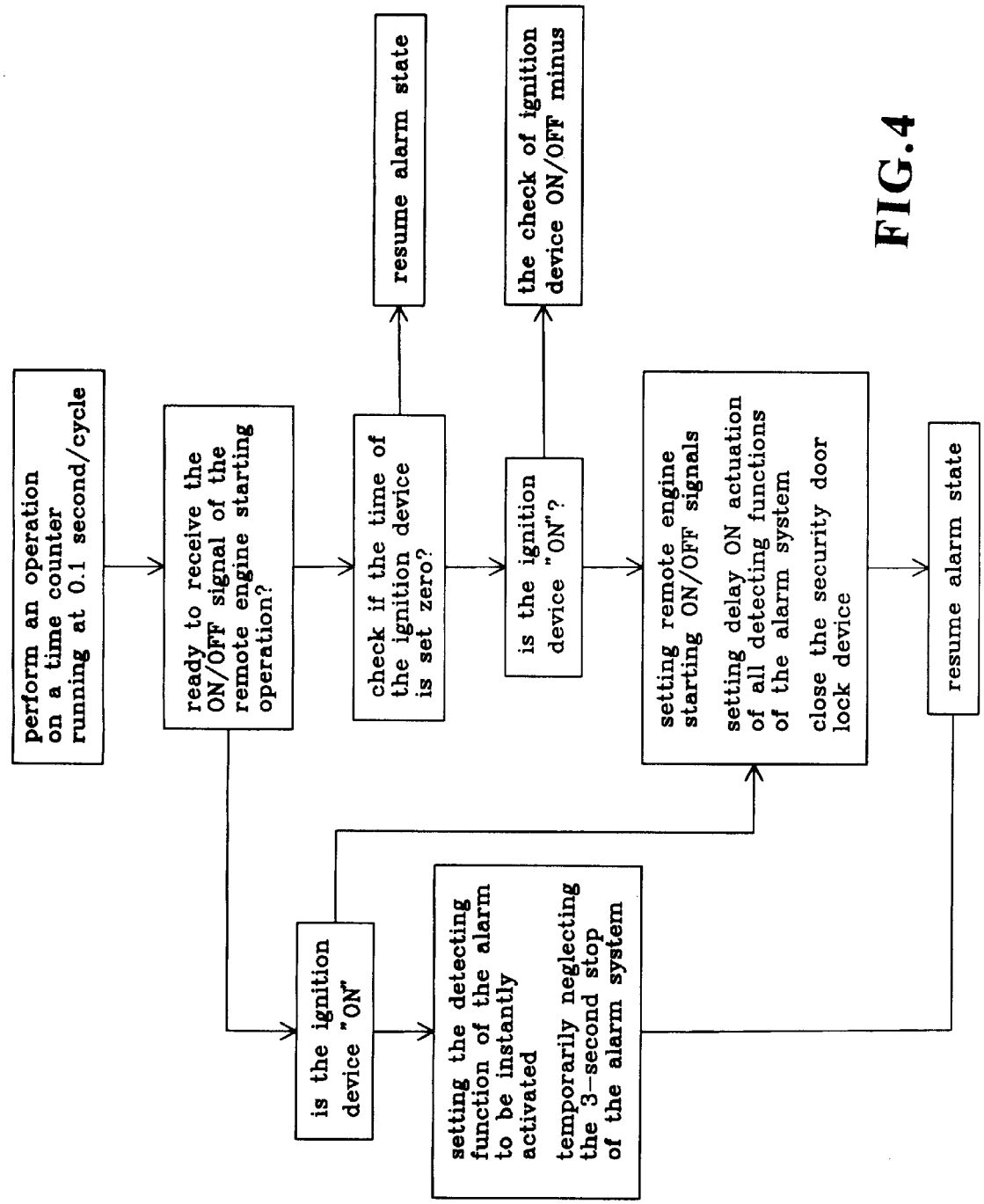
FIG. 4 is a flow chart 2 thereof.

To make the present invention understood with ease, a flow chart 1 as shown in FIG. 3 is illustrated. When a user makes use of a preset third channel of a remote control transmitter to get an engine started, the alarm unit 10 receives an engine starting signal, the CPU of the security system will make a judgement on if the engine is in an "ON" state. An "ON" state stands for the vehicle being in use, the system will carry out the engine starting signal transmitted by the third channel of the remote control transmitter, and the alarm unit 10 is set out of its detecting function for 3 seconds. If the engine is set in an "OFF" state, the system comes into a 1.5-second ON/OFF detecting mode of the ignition device 30.

Referring further to FIG. 2, in the ON/OFF detecting mode of the ignition device 30, a time counter is operated to check on a 0.1 second/per cycle base if the system receives an engine starting signal delivered by a remote control transmitter. If received, it stands for a successful starting of an engine, the system will execute the following steps:

1. setting an ON/OFF signal to remote control the engine.
2. delaying the triggering of all the detecting functions of the alarm unit 10.

3. switch off the security door lock system.

If the engine fails to start by a remote control signal, the system automatically comes into an "ON/OFF" detecting mode of the ignition device 30 to check if the IGCKT or timer is reset to zero; if reset to zero, the system will recheck if the ignition device 30 is set "ON", if "ON", the preceeding steps 1, 2, 3 will be executed. If "OFF", the system will bounce back with the ignition check timer (IGCKT) minus 1 to recheck again the "ON/OFF" mode of the ignition device 30 and resume alarm state.

Moreover, the user has started an engine by way of a remote control transmitter, after a period of time, the system will put the engine in an "OFF" state to indicate that the system has received an engine starting signal, but the ignition device 30 is in an "OFF" state, the system will execute the instant alarm function of the alarm unit 10 in neglence of the 3-second non-operation state of the alarm unit 10. So, even a driver does not get the vehicle moved, the vehicle is still in an alarm state to prevent the same from robbing or stealing.

Figure 5:
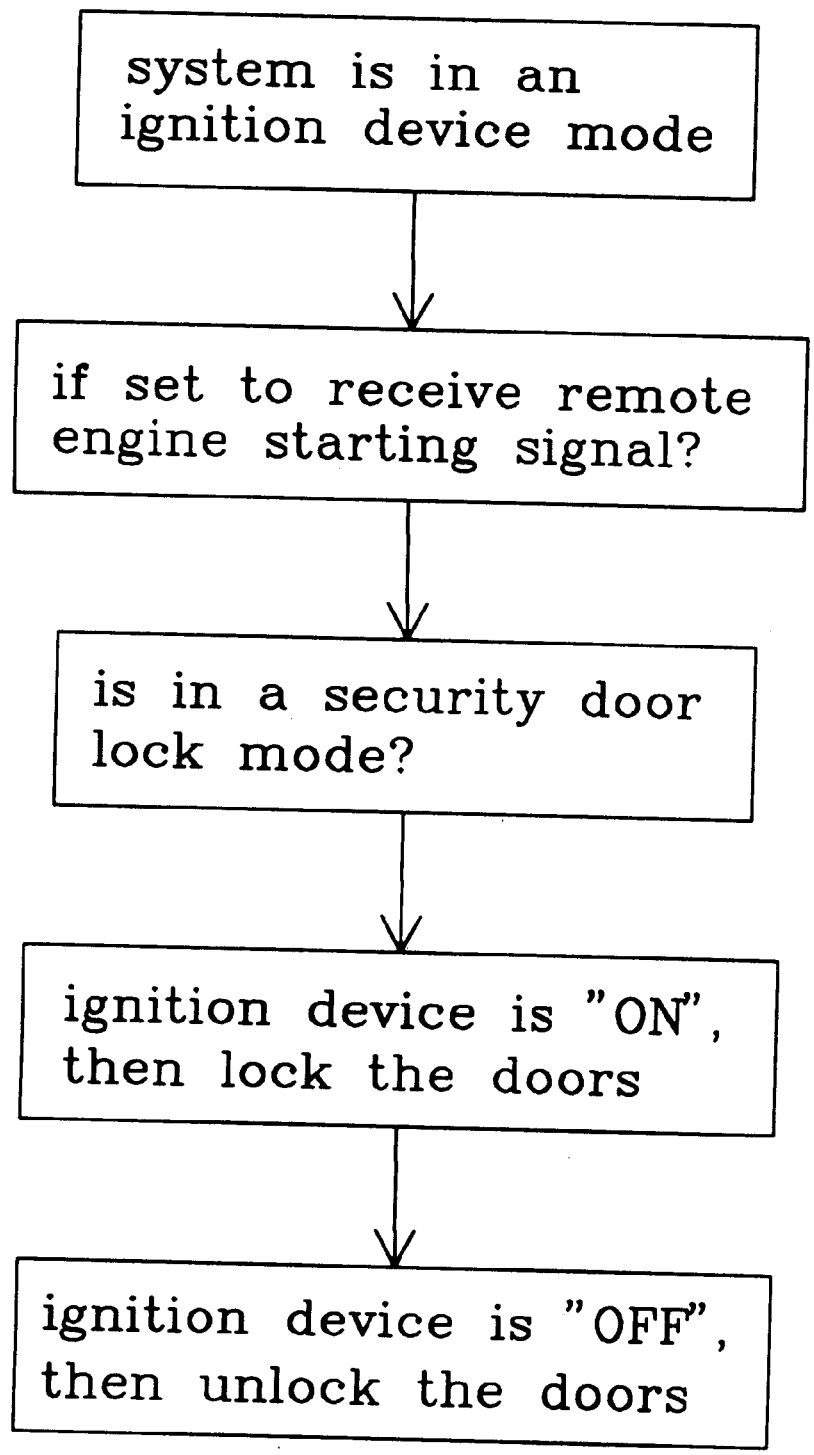
FIG. 5 is a flow chart 3 thereof.

Referring to FIG. 5, the flow chart 3 of the present invention, the security system is set in the ignition device mode 30; if the engine is successfully started by way of a remote control transmitter, the system will not actuate the security door device. If the engine does not receive a remote control signal to actuate the ON/OFF operation of the engine, the system will check if the security door lock device is started. When the ignition device 30 is in an "ON" state, the doors are locked; if in an "OFF" state, the doors will automatically be unlocked.

Figure 6:
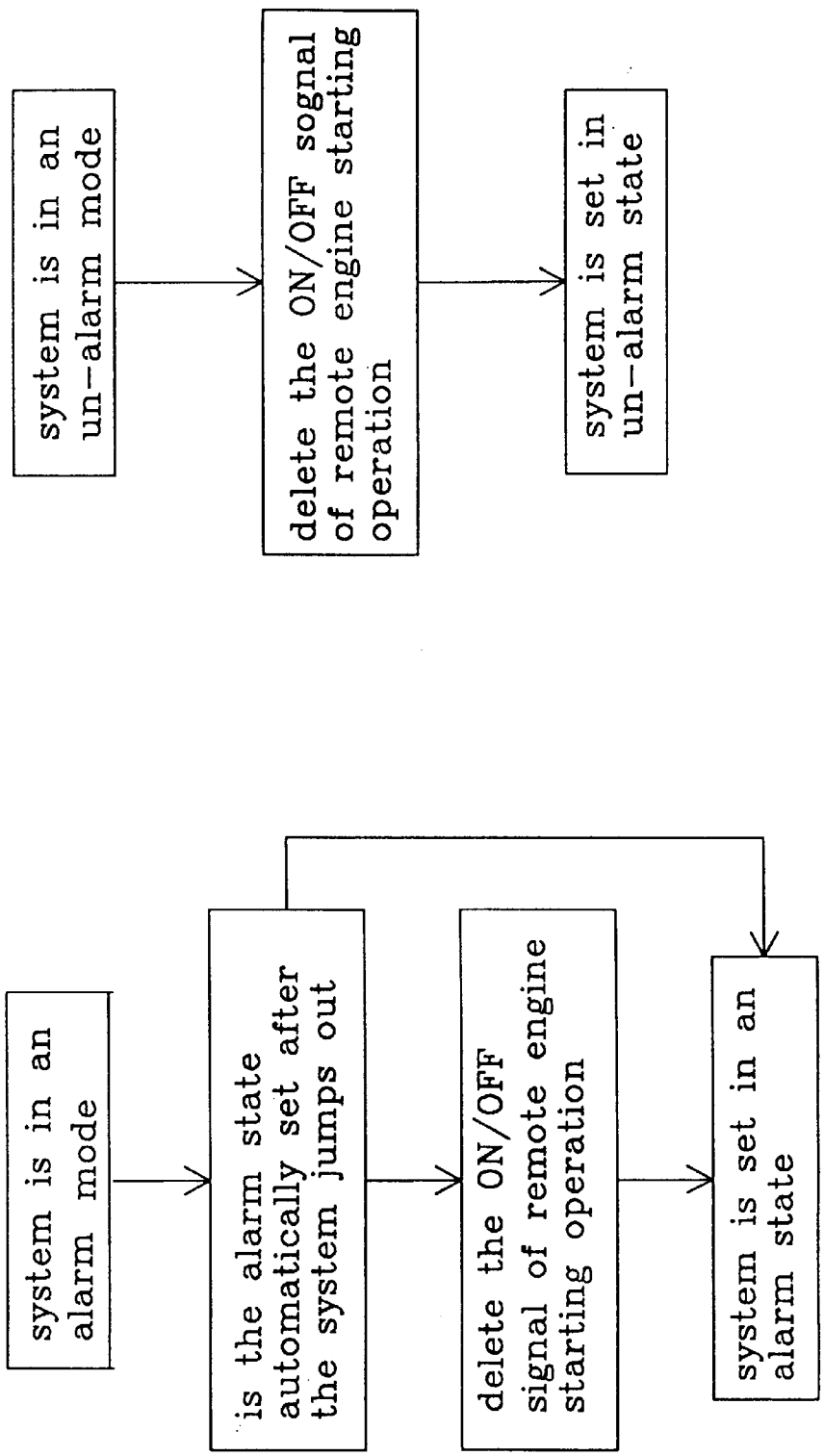
FIG. 6 includes the flow charts 4, 5 of the present invention.

Referring to FIG. 6, the flow charts 4, 5 of the present invention, after the system executes the ON/OFF operation of the alarm unit 10, it will immediately clear off the remotely delivered signal causing the ON/OFF of the engine strarting operation to resume the function of the alarm unit 10. If the system enters an alarm mode by itself, then the signal will not be deleted.

In brief, the present invention is coupled to the engine starter 40 so as to remotely start the engine. When the engine is set in an "ON" state, the alarm unit 10 will delay actuating the detecting function thereof. Once the engine is set in an "OFF" state, the system will resume its its alarm detecting function immediately.

For example, remotely starting an engine at a preset time or preset temperature. If the preset time is 6 hours, and the engine warming period is set 10 minutes, a prior art security system will remove its alarm detecting function for all the 6 hours. However, in the present invention, the system will delay the actuation of the arm unit 10 for the 10 minutes of engine warming operation, and the alarm unit 10 is still in operation for the rest of the five hours and fifty minutes so as to effectively protect a vehicle from stealing.

I claim:

1. An integrated security door lock system comprising:
a microprocessor including software;
an alarm unit;
a remote-control engine ignition unit including a relay;
an ignition device;
and an engine started by an engine starter;
and wherein the microprocessor is coupled to the remote-control engine ignition unit;
and wherein the alarm unit is coupled to the remote-control engine ignition unit by only an output wire.

2. The improvement according to claim 1, wherein the relay delays a detecting function of the alarm unit.

3. The improvement according to claim 1, wherein the door lock system keeps doors locked when the engine comes to a stop.

4. A method of operating a vehicle engine starting and security system including a software-controlled microprocessor controlling an engine starter and an anti-theft alarm; the method comprising:
starting a first time interval when a remote signal is received by the security system;
setting the anti-theft system to a bypass mode only if an ignition switch is turned during the first interval; and
setting the anti-theft system out of bypass mode when the ignition switch is turned off; wherein the anti-theft alarm includes first sensors responsive to engine running conditions and second sensors responsive to break-in conditions, and wherein only the engine running conditions are bypassed.

5. The method according to claim 4, wherein the first time interval is approximately 1.5 seconds long.

6. An integrated security door lock system comprising:
a microprocessor including software;
an alarm unit;
a remote-control engine ignition unit including a relay;
an ignition device;
and an engine started by an engine starter;
and wherein the microprocessor is coupled to the remote-control engine ignition unit;
and wherein the alarm unit is coupled to the remote-control engine ignition unit by only an output wire;
the remote-control engine ignition unit and the alarm are connected to the ignition device; and
the ignition device includes an output terminal coupled to the engine starter;
wherein the relay delays a detecting function of the alarm unit;
wherein the door lock system keeps doors locked when the engine comes to a stop.

* * * * *